(12) United States Patent
Albers et al.

(10) Patent No.: US 7,807,766 B2
(45) Date of Patent: Oct. 5, 2010

(54) POLYMERS FOR USE IN CLEANING COMPOSITIONS

(75) Inventors: Thomas Albers, Duesseldorf (DE);
Wolfgang Denuell, Duesseldorf (DE);
Stephen Gross, Souderton, PA (US);
Dirk Mampe, Duesseldorf (DE);
Florence Mazuel, Charenton-le-pont (FR); Hans-Christian Raths, Monheim (DE); Christoph G Schunicht, Essen (DE)

(73) Assignee: Cognis IP Management GmbH, Duesseldorf (DE)

( * ) Notice: Subject to any disclaimer, the term of this patent is extended or adjusted under 35 U.S.C. 154(b) by 0 days.

(21) Appl. No.: 11/530,240

(22) Filed: Sep. 8, 2006

(65) Prior Publication Data

US 2007/0179265 A1 Aug. 2, 2007

Related U.S. Application Data

(60) Provisional application No. 60/719,129, filed on Sep. 21, 2005.

(51) Int. Cl.
*C08F 22/38* (2006.01)
*C08F 28/02* (2006.01)
*C08F 20/06* (2006.01)

(52) U.S. Cl. .................. 526/288; 526/292.95; 526/307; 526/307.3; 526/307.4; 526/307.6; 526/317.1; 526/318.5; 510/405; 510/434

(58) Field of Classification Search .............. 526/288, 526/292.95, 307, 307.3, 307.4, 307.6, 317.1, 526/318.5; 510/405, 434

See application file for complete search history.

(56) References Cited

U.S. PATENT DOCUMENTS

| 4,631,136 | A | 12/1986 | Jones, III |
| 6,554,869 | B2* | 4/2003 | Aubay et al. ............... 8/137 |
| 6,593,288 | B2 | 7/2003 | Aubay et al. |
| 6,645,925 | B2* | 11/2003 | Sivik et al. ............... 510/237 |
| 6,696,067 | B2* | 2/2004 | Brandt et al. ............... 424/401 |
| 2007/0049500 | A1 | 3/2007 | Mueller et al. |

FOREIGN PATENT DOCUMENTS

| CA | 1 180 827 | 3/1962 |
| EP | 0 522 756 | 6/1992 |
| EP | 0 560 519 | 9/1993 |
| FR | 2 862 235 | 5/2005 |
| WO | WO 94/26381 | 11/1994 |
| WO | WO 99/05248 | 2/1999 |
| WO | WO 99/15186 | 4/1999 |
| WO | WO 01/05921 | 1/2001 |
| WO | WO 01/05922 | 1/2001 |
| WO | WO2004/029175 | 4/2004 |
| WO | WO 2005/012455 | 2/2005 |

\* cited by examiner

*Primary Examiner*—Helen L. Pezzuto

(57) ABSTRACT

Polymers which are suitable for use in cleaning compositions are described. The polymers are comprised of at least three different monomers. The types of monomers and ratios of the monomers in the polymers are further disclosed. Cleaning compositions containing the polymers for treating various surfaces and for use in various applications are also provided.

16 Claims, No Drawings

POLYMERS FOR USE IN CLEANING COMPOSITIONS

CROSS-REFERENCE TO RELATED APPLICATIONS

This application claims priority from U.S. Provisional Application Ser. No. 60/719,129 filed Sep. 21, 2005, which is incorporated herein in its entirety.

FIELD OF THE INVENTION

The present invention pertains to new polymers, a process for producing them, and the use of the polymers in laundering and cleaning agents, preferably in cleaning agents for hard surfaces.

BACKGROUND OF THE INVENTION

Numerous agents for cleaning hard surfaces made of glass, ceramic, porcelain metal, or plastics, such as those that occur in the household and commercial sectors, are described in various patents. Whereas these formulations are highly effective with regard to the primary cleaning performance, a frequently occurring problem is that the cleaning result is reduced by dried-on water drops; Ca and Mg salts, especially lime; surfactant residues and other residues, so that the treated surfaces appear optically unclean or may have a reduced luster.

It is known that certain polymers may be added as additives to cleaner formulations to reduce the disadvantages described. It is common in the state of the art that this involves polymers that modify the treated surface at least temporarily in such a way that it shows increased hydrophilicity. In this manner, it is accomplished that the contact angle between the treated surface and a water drop assumes the smallest possible value. In the extreme case, it is accomplished in this way that water drops spread out to form a homogeneous thin film and thus the drying-on of isolated water drops is prevented.

In WO 01/05921 A1, water-soluble or water-dispersible copolymers for this purpose are disclosed, which contain at least one certain cationic, nitrogen-containing monomer and a hydrophilic monomer copolymerized in. The polymer makes the surface hydrophilic.

In WO 01/05922, water-soluble or water-dispersible copolymers for the same purpose are disclosed, which in the form of polymerized units contain at least one certain cationic, nitrogen-containing monomer, a carboxyl or anhydride group-containing monomer, and optionally an additional neutral hydrophilic monomer. Again, the polymer serves to make the surface hydrophilic.

WO 99/05248 describes agents for automatic dishwashing that contain water-soluble or water-dispersible cationic or ampholytic polymers, wherein the polymers have cationic properties in the pH range of 6 to 11.

EP 0 560 519 A1 describes water-soluble, ampholytic terpolymers with a molecular weight $M_w$ of 750-30,000 Da for use as additives, preferably in cleaner formulations for dishwashing machines. Hydrophobic monomers such as alkylacrylamides or alkyl(meth)acrylates are present at a maximum of 25%, if at all.

EP 0 522 756 B1 describes ampholytic terpolymers with improved conditioning properties in shampoo compositions and hair care agents.

However, a continuing need exists for discovering additional additives that have improved properties compared to the state of the art. For example, by addition of the polymers of the state of the art, the drying-on of isolated water drops is hindered by the fact that these spread out into a homogeneous, thin water film, reducing the formation of distinctly visible margins. However, the water film remains on the surface, where it dries as a whole. Frequently this leads to a reduction of the luster by visible streaks, especially when the surface is not rinsed off after cleaning has been performed.

BRIEF SUMMARY OF THE INVENTION

The present invention provides novel water-soluble polymers that eliminate the aforementioned drawbacks and a process for producing them. The polymers of the invention further provide improved properties compared with the state of the art for cleaning hard surfaces.

Surprisingly, it was found that certain ampholytic terpolymers have the desired properties. Terpolymers are copolymers produced by polymerization of at least three different polymers.

The object of the present invention is, in a first embodiment, polymers soluble in water at 20° C. for use in cleaning compositions which in the form of polymerized units contain in each case at least one monomer a) $aH_2C=CR^1—CO—NH—R^2—N^+R^3R^4R^5X^-$ 

wherein $R^1$ represents a hydrogen atom or an alkyl radical with 1 to 4 C atoms, $R^2$ represents a linear or branched alkylene radical with 1 to 12 C atoms, $R^3$, $R^4$ and $R^5$, independently of one another, each represent a hydrogen atom, an alkyl radical with 1 to 18 C atoms or a phenyl radical, and $X^-$ represents an anion from the group of halogens, sulfates or alkylsulfates, hydroxide, phosphate, acetate, formate or ammonium, and b) $H_2C=CR^6—CO—NR^7R^8$ 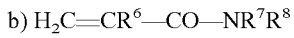

wherein $R^6$ represents a hydrogen atom or an alkyl radical with 1 to 4 C atoms and $R^7$ and $R^8$, independently of one another, each represent a hydrogen atom, an alkyl radical with 1 to 4 C atoms or a C3-C6 cycloalkyl radical, with the specification that $R^7$ and $R^8$ do not simultaneously represent a hydrogen atom, and c) an acrylic and/or methacrylic acid and/or d) additional monomers from the group of C3-C6 singly ethylenically unsaturated carboxylic acids such as crotonic acid, maleic acid, maleic anhydride, fumaric acid, itaconic acid, and half-esters and salts thereof or $H_2C=CR—CO—NH—CR'R''R'''—SO_3H$  and salts thereof, especially the alkali metal and ammonium salts, wherein R, R', R", and R'" independently of one another represent a hydrogen atom or an alkyl(ene) radical with 1 to 4 C atoms, with the specification that in the polymer, the monomer c) is contained in quantities of a maximum of 25 wt % based on the polymer, in cleaning agents.

Polymers in accordance with the above specification are preferred in which the weight fraction of monomers c) amounts to less than 15 wt % and especially equal to or less than 10 wt %. A preferred weight range for monomer c) is 5 to 25, preferably 5 to 15 and especially 5 to 10 wt %, in each case based on the total weight of the polymer.

The polymers in accordance with the invention contain, as polymerized monomers, at least three monomers a) to d) different from one another. Here, all polymers are included which contain either the monomer units a), b) and c) or a), b)

and d) or a), b), c) and d) simultaneously. It is also within the scope of the present invention to use mixtures of the polymers listed.

DETAILED DESCRIPTION OF THE INVENTION

Monomer Component a)

The monomers of this type follow the general formula:

$$H_2C=CR^1-CO-NH-R^2-N^+R^3R^4R''X^-$$

wherein $R^1$ represents a hydrogen atom or an alkyl radical with 1 to 4 C atoms, $R^2$ represents a linear or branched alkylene radical with 1 to 12 C atoms and $R^3$, $R^4$ and $R^5$ independently of one another represent a hydrogen atom, an alkyl radical with 1 to 18 C atoms, or a phenyl radical, and X represents an anion from the group of halogens, sulfates or alkylsulfates, hydroxide, phosphate, acetate, formate or ammonium. Particularly preferred are monomers of type a) in which $R^1$ represents a methyl radical, $R^2$ represents a $CH_2-CH_2-CH_2$ group, and the radicals $R^3$, $R^4$ and $R^5$ each represent a methyl radical. $X^-$ represents a suitable counter-ion such as halide, hydroxide, sulfate, hydrogen sulfate, phosphate, formate or acetate, preferably chloride. The monomer, 3-trimethylammoniumpropylmethacrylamide chloride (MAPTAC), is particularly preferred.

Monomer Component b)

The second monomer building block contained in the polymers in accordance with the invention is a nitrogen-containing, ethylenically unsaturated compound of the following general formula:

$$H_2C=CR^6-CO-NR^7R^8$$

wherein $R^6$ represents a hydrogen atom or an alkyl radical with 1 to 4 C atoms and $R^7$ and $R^8$, independently of one another, each represent a hydrogen atom, an alkyl radical with 1 to 4 C atoms or a C3-C6 cycloalkyl radical, with the specification that $R^7$ and $R^8$ do not simultaneously represent hydrogen. Monomer b) encompasses the acrylamides. Particularly preferred is N-isopropylacrylamide, also known under the abbreviation NIPAM.

Monomer Component c)

As the third component c), ethylenically unsaturated acids and their salts such as acrylic or methacrylic acid are suitable. Acrylic acid (AA) is the particularly preferred monomer here. Particularly suitable salts are the alkali metal and ammonium salts.

Monomer Component d)

Additional monomers may be present in the polymers in accordance with the invention in addition to or instead of component c). They are selected from the group of the C3-C6 singly ethylenically unsaturated carboxylic acids such as crotonic acid, maleic acid, maleic anhydride, fumaric acid, itaconic acid, and their half-esters and salts or $H_2C=CR-CO-NH-CR'R''R'''-SO_3H$ and salts thereof, especially the alkali metal and ammonium salts, wherein R, R', R", and R''' independently of one another represent a hydrogen atom or an alkyl(ene) radical with 1 to 4 C atoms. Particularly preferred here as the monomer building block of type d) is the molecule with the general formula or $H_2C=CR-CO-NH-CR'R''R'''-SO_3H$, wherein especially a derivative, 2-acrylamido-2-methylpropane-sulfonic acid (AMPS) is suitable.

Additional monomer building blocks may be present in the polymers in accordance with the invention in addition to the aforementioned a) to d), wherein here especially nitrogen-containing monomers are preferred. Examples are dimethyl-diallylammonium chloride (DADMAC), 2-dimethylamino-ethyl(meth)acrylate (DMAE(M)A), 2-diethylamino-ethyl (meth)acrylate, 3-dimethylaminopropyl(meth)acrylamide (DMAP(M)A), 3-dimethyl-amino-2,2-dimethylpropylacrylamide (DMADMPA), and the derivatives thereof, which can be obtained by protonation or quaternization, especially 2-trimethyl-ammoniumethyl(meth)acrylate chloride and 3-diethylmethylammoniumpropyl-acrylamide chloride.

The polymers in accordance with the invention are water-soluble, i.e., at least 0.1 g of the polymer is soluble in 100 ml water at 20° C. The polymers are ampholytic, i.e., the polymers have both acid and basic hydrophilic groups and show acidic or basic behavior depending on the conditions. The polymers in accordance with the invention preferably have a mean molecular weight (weight average molecular weight, Me), measured by aqueous gel permeation chromatography (GPC) with light scattering detection (SEC-MALLS), in the range of 10,000 to 500,000 Da. Preferably, the molecular weight of the polymers is between 50,000 and 350,000 Da and especially between 100,000 and 250,000 Da. A particularly preferred range may fall between 110,000 and 140,000 Da.

The various monomer building blocks a) to d) preferably occur in certain selected quantitative ratios along with one another. Preferred in each case are polymers that contain the component (b) in excess (both on a molar basis and based on the weight of the components) relative to the components a) and c). Preferred here are polymers in which the molar ratio between the monomers a), b) and c) is in the range from 1:10:1 to 5:10:5 and preferably in the range from 4:10:1 to 4.10:3 and especially in the range form 3:8:2 to 3:8:1.

Particularly preferred are especially polymers in which the molar ratio between the components a) and b) is 1:10 to 1:1 and especially 1:5 to 1:1.

Based on mol-% of the respective monomers, preferably 20 to 30% of monomer a), 50 to 70% of monomer b) and 10 to 20% of monomer c) are present. As long as the monomer building block of type d) is present instead of the component c), the same relationships apply analogously. Particularly preferred, however, may be polymers that contain both monomers of type c) and type d) together. Preferably the monomer building blocks c) and d) are present simultaneously in a molar ratio of 2:1 to 1:2, but particularly preferably in a 1:1 ratio. Particularly preferred polymers with four different monomer building blocks have molar ratios a):b):c):d) of 2:4:1:1 to 1:10:1:1. A particularly preferred ratio is 3:8:1:1.

Preferred polymers in particular are those in which the monomer a) is selected from compounds of the general formula in which R' represents a methyl group, $R^2$ represents an alkylene radical with 3 C atoms, $R^3$, $R^4$ and $R^5$ respectively represent methyl radicals and X represents chloride, the monomer b) is selected from compounds of the general formula in which $R^6$ and $R^7$ represent hydrogen atoms and $R^8$ represents an isopropyl radical, and monomer c) represents $H_2C=CR-CO-NH-CR'R''R'''-SO_3H$ and its salts, especially the alkali metal and ammonium salts, wherein R, R', R", and R''' independently of one another represent a hydrogen atom or an alkyl(ene) radical with 1 to 4 C atoms.

Such polymers in accordance with the invention can be produced by various polymerization processes. They can, for example, be produced by solution polymerization or bulk polymerization. Preferably they are produced by solution polymerization, thus polymerization of monomers in solvents and/or water, in which both the monomers and the polymers resulting from them are soluble. In addition, the polymerization can be performed by taking the total quantity of monomer initially or under monomer inflow, batchwise, semi-continuously or continuously. Preferably, the polymerization is performed as batch polymerization with or without monomer inflow.

An additional object of the present invention therefore pertains to a process for producing polymers in accordance with the above specification, wherein preferably first an aqueous mixture of the monomers a) and c) is produced, adjusted to a pH in the range of 5 to 11, then the monomer b) and optionally additional monomer components d) are added, and then followed with the addition of an initiator.

Suitable initiators are the free radical or redox initiators known in the art. This comprises, for example, organic compounds of the azo type, e.g., azobisamidinopropane dihydrochloride, azobisisobutyronitrile, azobis(2,4-dimethylvaleronitrile) and the like; organic per esters, e.g., tert-butylperoxypivalate, tert-amylperoxypivalate, tert-butylperoxy 2-ethylhexanoate and the like; inorganic and organic peroxides such as $H_2O_2$, tert-butylhydroperoxide, benzyl peroxide and the like; and redox initiators such as oxidizing agents, for example ammonium or alkali metal persulfates, chromates and bromates and reducing agents such as sulfites and bisulfites, as well as ascorbic acid and oxalic acid and mixtures thereof. These initiators are added in a quantity that is sufficient to initiate the polymerization reaction. Usually from 0.001 to a maximum of 1 wt % of an initiator, based on the sum of the monomers used, is sufficient for this purpose. Quantities of <0.5% are preferred, and quantities between 0.5% and 0.01% are particularly preferred. The amount, however, depends on the type of initiator used. The initiator can be added either in one portion at the beginning of the reaction or continuously over a prolonged time period.

In addition to the initiator, one or more promoters likewise may be used. Suitable promoters include water-soluble metal salts. Suitable metal ions are especially iron, copper, cobalt, manganese, vanadium, and nickel. Particularly preferred are water-soluble salts of iron and copper. If used, their content is between 1 and 100 ppm, preferably 3 to 25 ppm, based on the total of the monomers used. The temperature of the polymerization reaction is dependent upon the selection of the initiator and the solvent and the desired molecular weight. The reaction is preferably carried out at elevated temperatures, especially in the range from 30 to 100° C. and particularly preferably in the range of 40 to 90° C. In this process, preferably first the monomer components a) and c) are dissolved at room temperature (20° C.) in a suitable solvent, preferably water, and then a weakly acidic pH is established. Then preferably the monomer b) and optionally additional monomer components d) are added. Preferably this step is then followed by heating and addition of the initiator.

Particularly preferred and therefore another aspect of the present invention is a polymer that is soluble in water at 20° C., containing at least three different monomers a), b), c) and/or d), wherein the monomers a) and b) are present in a molar ratio of 1:1 to 1:10 and in addition the monomers c) and/or d) are present, wherein as the monomer a) 3-trimethylammoniumpropyl-methacrylamide chloride (MAPTAC) is preferred, as the monomer b) N-isopropyl-acrylamide (NIPAM), as monomer c) acrylic acid (M) and/or methacrylic acid (MA), and as monomer d) 2-acrylamido-2-methyl-1-propanesulfonic acid (AMPS) is preferred, with the specification that the monomer c) is present in the water-soluble polymer in quantities of a maximum of 25 wt % based on the total weight of the water-soluble polymer. Polymers in accordance with the preceding description are preferred in which the weight fraction of monomer c) amounts to less than 15 wt % and especially equal to or less than 10 wt %. A preferred weight range for monomer c) is 5 to 25, preferably 5 to 15 and especially from 5 to 10 wt %, in each case based on the total weight of the polymer.

These polymers can also be described by the following schematic formula:

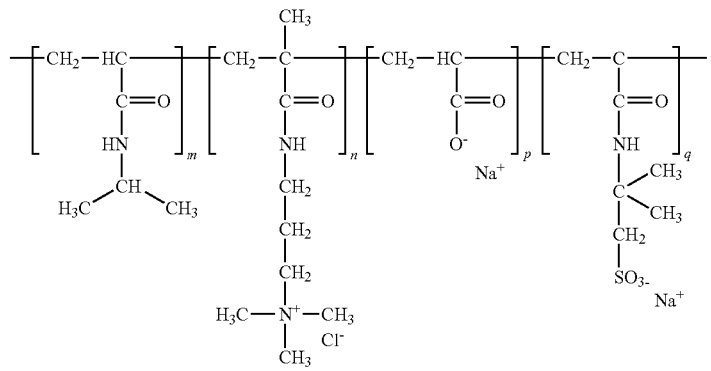

The subscripts m, n, p and q provide the numbers of the monomer building blocks NIPAM, MAPTAC, M and AMPS in the polymer molecule. However, the sequence of the building blocks in the polymers in accordance with the invention may be varied; and all sequences of the individual building blocks, whether blocks of the individual monomers or their purely stochastic sequences in the molecule, are included.

By way of the invention, those derivatives are particularly preferred which contain the monomers MAPTAC, NIPAM and AMPS polymerized in weight ratios of 25 to 50% MAPTAC, 40 to 75% NIPAM and 1 to 15% AMPS, with the specification that the sum of the percentages is 100.

A polymer that is likewise preferred is one which contains the monomers NIPAM, MAPTAC, and M in weight ratios of 25 to 50% MAPTAC, 40 to 75% NIPAM and 1 to 15% M polymerized, with the specification that the sum of the percentages is 100. Also preferred is a polymer that is water-soluble at 20° C. and contains the monomers MAPTAC, NIPAM, M and AMPAS in weight ratios of 25 to 45% MAPTAC, 40 to 70% NIPAM, 1 to 15% M and 1 to 15% AMPS, with the specification that the sum of the percentages is 100.

For these polymers as well, the above-described preferred molar ratios are applicable, and also the preferred weight ratios of the monomers within the polymers, i.e., thus the molar ratio between the monomers a), b) and c) or d) lies in the range of 1:10:1 to 5:10:5 and preferably in the range of 4:10:1 to 4:10:3 and especially in the range of 3:8:2 to 3:8:1. A particularly preferred polymer contains the monomers a), b), c) and d) in the molar ratio of 3:8:1:1.

The weight ratio based on the polymer amounts to 20 to 30 wt % of monomer a), 50 to 70 wt % of monomer b) and 10 to 20 wt % of monomers c) and/or d), with the specification that the sum of the percentages is 100. The monomers c) and d), if they are present simultaneously in the polymer, are preferably present in the weight ratio of 1:1. The mean molecular weight of the selected polymers, as described in detail above, is preferably in the range of 10,000 to 500,000.

The amphoteric polymers of the present invention are especially suitable as additives in laundry detergents and particularly preferably in cleaning agents. Especially in cleaning agents for all types of hard surfaces, the polymers provide advantageous properties. They are suitable for modifying hard surfaces in terms of their hydrophilicity, based on the fact that the contact angle that liquids, especially water, form on the hard surfaces falls in the range of 50° C. to a maximum of 100° C.

It was also found that with the polymers in accordance with the invention, it is possible to make hydrophilic surfaces with contact angles of <50° more hydrophobic, whereas surfaces with contact angles of >50° become more hydrophilic. After rinsing with water, this leads to rapid runoff of the liquid from the surface, which in turn prevents or reduces the formation of deposits and thus spotting or filming.

In addition, not only is the primary cleaning power increased, but also the resoiling tendency is reduced and repeated cleaning is distinctly facilitated. The polymers in accordance with the invention are also capable of imparting increased luster to hard surfaces.

It is preferred by way of the invention, i.e., for achieving the above-mentioned effects, thus increasing the luster, increasing the hydrophilicity or hydrophobicity, increasing the cleaning performance or reducing the resoiling tendency, the polymers be used advantageously in quantities of 0.01 to 5 wt %, preferably in quantities of 0.03 to 0.5 wt % and especially in quantities of 0.03 to 0.09 wt %, in each case based on the respective cleaning agent, to optimally achieve the desired effect. Depending on the type and composition of the cleaning agent, however, smaller or larger quantities of the polymer may also be suitable.

Various cleaning agents may be used together with the polymers in accordance with the invention. Such cleaning agents usually contain anionic, nonionic, cationic and/or zwitterionic surfactants in combination. In addition, such agents may also contain abrasives to remove stubborn soil from the surface. Furthermore, bleaches, builders, water softeners, suspending agents, enzymes, pH regulators, biocides, solubilizers, dispersants, emulsifiers, dyes, perfume, etc. may be present. Cleaners may exist in solid form, as powders or granulates or as a stick, or may be in the form of a liquid or gel.

There are cleaners for a great multitude of applications, beginning with all-purpose cleaners for household or industry, special cleaners for bathroom and kitchen tiles, cleaners for glass, metal, and plastic surfaces, cleaners for various floors (wood, ceramic, linoleum, laminate, etc.), cleaners for motor vehicles, cleaners for sanitary facilities (toilets) or disinfectants and dishwashing detergents. The use of the polymers in dishwashing detergents, especially in liquid dishwashing detergents for manual dishwashing, as disclosed in EP 522 756, may also be accomplished by way of the invention.

Many cleaners, e.g., for toilets or those used to remove fatty and oily soils, often have extreme pH values (pH values <3 or >8). The polymers of the invention may also advantageously be used at these extreme pH values without losing their properties. Therefore, the polymers in accordance with the invention are preferably used in all-purpose cleaners, especially alkaline cleaners, cleaners for the bathroom and ceramic surfaces, the toilet and other sanitary equipment, cleaners for glass and plastics, special cleaners e.g. for shower stalls, but also for metal surfaces, especially foe lacquered metal surfaces and preferably for the cleaning of surfaces in the automotive sector are preferred. An additional preferred application area is floor cleaners, especially for linoleum or laminate floors.

The polymers of the present invention show particular stability toward extreme pH values, so that use in such cleaners is particularly preferred. The polymers of the present invention therefore can be used advantageously in cleaners for hard surfaces, the pH of which is in the range of 8 and preferably of greater than 8, especially in cleaners that have a pH in the range of 8 to 14, preferably of 8 to 12 and especially of 9 to 12. Because of the hydrolysis-stable structure of the water-soluble polymers, however, they are also suitable for use with acid cleaners (pH <6 and especially pH <3). Therefore, the use of the polymers in acid cleaners whose pH is less than or equal to 6 is preferred. Particularly preferred is their use in acid cleaners whose pH is between 2 and 6, preferably 2.5 and 5.5 and particularly preferably from 3 to 5.

The following Examples are illustrative of the invention and should not be construed in any manner whatsoever as limiting the scope thereof.

EXAMPLES

Preparation of a Polymer in Accordance with the Invention

A terpolymer in accordance with the invention was prepared as follows: 12.4 g MAPTAC, 1.4 g acrylic acid and 50 g water were mixed. The pH of the aqueous mixture was adjusted in the range of 6.5 to 7.5. Then 8.5 g NIPAM and 23 g isopropanol were added and this mixture was heated to 65° C. Then 0.15 g 2,2'-azobis(2-amidinopropane) dihydrochloride was added as the initiator and the reaction was started. The mixture was heated to about 80° C. in this process. After the reaction had run to completion, the water/isopropanol azeotrope was distilled off at 80-100° C. The concentration of the resulting polymer solution was about 22 wt %. The pH of the solution was between 5 and 7.5. The polymer had a molecular weight of 130,000 Da (measured by SEC-MALLS).

Application-Technology Testing

Luster Test:

A test formulation was applied to a ceramic plate, wiped off, and allowed to dry. The resulting surface was examined for luster and compared with the original, clean surface. The luster retention was calculated from the values. The luster was measured with the Micro-TRI-Gloss instrument from the firm of BYK Gardner at an angle of 200. Two polymers in accordance with the invention were tested. Polymer I contained the monomers MAPTAC, NIPAM and M in a molar ratio of 3:8:2. Polymer II contained the monomers MAPTAC, NIPAM, M and AMPS in a molar ratio of 3:8:1:1. A formulation that contained a nonionic surfactant without and with the polymers was investigated, wherein a neutral pH was established in sample 1 and an alkaline pH in sample 2. In sample 3, the polymers were added to a commercial all-purpose cleaner.

The polymers I and II in accordance with the invention were each used in quantities of 0.5 wt % of a 20 wt % aqueous solution. The active substance content therefore was 0.1 wt %.

In all cases, the addition of the polymers in accordance with the invention led to a distinct improvement in the luster values of the treated surfaces. The results of the luster test are summarized in Table 1.

TABLE 1

| No. | Formulation | Luster retention |
|---|---|---|
| 1 | 1% Isodecanol-8-EO<br>99% Water<br>pH 7 | 78.0% |
|  | 0.5% Polymer II<br>1% Isodecanol-8-EO<br>98.5% Water<br>pH 7 | 94.0% |
|  | 0.5% Polymer I<br>1% Isodecanol-8-EO<br>98.5% Water<br>pH 7 | 96.0% |
| 2 | 1% Isodecanol-8-EO<br>99% Water<br>pH 12 | 77.0% |
|  | 0.5% Polymer II<br>1% Isodecanol-8-EO<br>98.5% Water<br>pH 12 | 92.0% |
|  | 0.5% Polymer I<br>1% Isodecanol-8-EO<br>98.5% Water<br>pH 12 | 92.0% |
| 3 | Commercial all-purpose cleaner<br>pH 12 | 59.0% |
|  | 0.5% Polymer II<br>Commercial all-purpose cleaner<br>pH 12 | 79.0% |
|  | 0.5% Polymer I<br>Commercial all-purpose cleaner<br>pH 12 | 80.0% |

Contact Angle Test

The contact angles were measured on various surfaces (ceramics, PVC, lacquered metal) in that a test formulation was applied and wiped off. After drying, the surface was rinsed with deionized (DE) water and allowed to dry. The contact angle with DE water was measured on the surfaces prepared in this way (apparatus: contact angle measurement device from Dataphysica, Filderstadt, Model OCAH-200). All quantities are in wt %.

1. Contact Angle on Ceramic Tiles

| No. | Formulation | Contact angle |
|---|---|---|
| 1 | Untreated | 33° |
| 2 | 0.5% Polymer II<br>1% Isodecanol-8-EO | 50° |
| 3 | 0.5% Polymer I<br>1% Isodecanol-8-EO | 52° |
| 4 | 0.5% Polymer II | 52° |
| 5 | 0.5% Polymer I | 53° |

2. Contact Angle on Automotive Lacquer Surfaces

| No. | Formulation | Contact angle |
|---|---|---|
| 6 | Untreated | 80° |
| 7 | 0.5% Polymer I<br>1% Isodecanol-8-EO | 75° |
| 8 | 0.5% Polymer II<br>1% Isodecanol-8-EO | 73° |

3. Contact Angle on PVC

| No. | Formulation | Contact angle |
|---|---|---|
| 9 | Untreated | 95° |
| 10 | 0.5% Polymer I<br>1% Isodecanol-8-EO | 87° |

The results show that the polymers in accordance with the invention are suitable for both increasing (hydrophobic) and decreasing (hydrophilic) the contact angle of water on the surfaces.

Benefits, other advantages, and solutions to problems have been described above with regard to specific embodiments. The benefits, advantages, solutions to problems and any element(s) that may cause any benefit, advantage, or solution to occur or become more pronounced are not to be construed as a critical, required, or essential feature or element of any or all of the claims.

What we claim is:

1. A water-soluble polymer for use in cleaning compositions comprising at least 4 monomers of the following formulae:
   a) $H_2C=CR^1-CO-NH-R^2-N^+R^3R^4R^5X^-$
      wherein $R^1$ represents hydrogen or C1-C4 alkyl;
      $R^2$ represents linear or branched C1-C12 alkylene;
      $R^3$, $R^4$ and $R^5$, independently of one another, each represent hydrogen, C1-C18 alkyl or phenyl;
      and $X^-$ represents an anion selected from the group consisting of halide, sulfate, alkylsulfate, hydroxide, phosphate, acetate and formate;
   b) 40-75% by weight of N-isopropylacrylamide, based on the water-soluble polymer;
   c) acrylic and/or methacrylic acid and/or salts thereof; and
   d) at least one monomer selected from the group consisting of
      (1) $C_3$-$C_6$ singly ethylenically unsaturated carboxylic and dicarboxylic acids, half-esters thereof, and salts thereof; and
      (2) $H_2C=CR-CO-NH-CR'R''R'''-SO_3H$, and salts thereof; wherein R, R', R", and R'" independently represent hydrogen, C1-C4 alkyl or C1-C4 alkylene,
   wherein monomer c) is present in the water-soluble polymer at a maximum of about 25 wt % based on the total weight of the water-soluble polymer, and wherein cleaning compositions comprising the water-soluble polymer show improved luster retention and rinsing properties.

2. The polymer of claim 1 wherein monomer a) is 3-trimethylammoniumpropylmethacrylamide chloride.

3. The polymer of claim 1 wherein monomer d) is 2-acrylamido-2-methyl-1-propane-sulfonic acid.

4. The polymer of claim 1 wherein the monomers a), b), and c) are present in a molar ratio of from about 1:10:1 to 5:10:5, respectively.

5. The polymer of claim 4 wherein the molar ratio is from about 3:8:2 to 3:8:1.

6. The polymer of claim 1 wherein the monomers a), b), c), and d) are present in a molar ratio of from about 3:8:1:1, respectively.

7. The polymer of claim 1 wherein the monomers a), b), c), and d) are present in weight ratios of about 25 to 45%, about 40 to 70%, about 1 to 15%, and about 1 to 15%, respectively, based on 100% weight of the polymer.

8. A cleaning composition which comprises the polymer of claim 1, showing improved luster retention and rinsing properties.

9. A cleaning composition which comprises a polymer comprising monomers of trimethylammoniumpropyl-methacrylamide chloride; 40-75% by weight, based on the water-soluble polymer, of N-isopropylacrylamide; acrylic acid and/or methacrylic acid and salts thereof; and 2-acrylamido-2-methyl-1-propane-sulfonic acid,
wherein the composition shows improved luster retention and rinsing properties.

10. The cleaning composition of claim 9 wherein the composition has a pH of greater than or equal to 8.

11. The cleaning composition of claim 9 wherein the composition has a pH of less than or equal to 6.

12. The cleaning composition of claim 9 wherein the polymer is present in an amount of from about 0.01% to about 5 wt %.

13. The polymer of claim 1 wherein the monomers a), b), and c) are present in a mole percent basis of from about 20% to about 30% of a), from about 50% to about 70% of b), and from about 10% to about 20% of c).

14. A water-soluble polymer for use in cleaning compositions comprising at least the following monomers:
 a) 25-50% by weight of 3-trimethylammoniumpropyl-methacrylamide chloride;
 b) 40-75% by weight of N-isopropylacrylamide;
 c) 1-15% by weight of acrylic acid or salts thereof; and
 d) 1-15% by weight of 2-acrylamido-2-methyl-1-propane-sulfonic acid or salts thereof,
 wherein cleaning compositions comprising the water-soluble polymer show improved luster retention and rinsing properties.

15. A cleaning composition comprising the water-soluble polymer of claim 14, showing improved luster retention and rinsing properties.

16. The water-soluble polymer of claim 1 wherein component d) is selected from the group consisting of
 (1) $C_3$-$C_6$ singly ethylenically unsaturated carboxylic and dicarboxylic acids, half-esters thereof, and salts thereof;
 (2) $H_2C$=CR—CO—NH—CR'R"R'''-$SO_3H$, and salts thereof; wherein R, R', R", and R''' independently represent hydrogen, C1-C4 alkyl or C1-C4 alkylene; and
 (3) maleic anhydride.

* * * * *